US011228976B2

(12) United States Patent
Wu et al.

(10) Patent No.: US 11,228,976 B2
(45) Date of Patent: Jan. 18, 2022

(54) POWER SAVING FOR NEW RADIO CARRIER AGGREGATION

(71) Applicant: MediaTek Inc., Hsinchu (TW)

(72) Inventors: Wei-De Wu, Hsinchu (TW); Yi-Ju Liao, Hsinchu (TW); Chi-Hsuan Hsieh, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/790,688

(22) Filed: Feb. 13, 2020

(65) Prior Publication Data

US 2020/0267645 A1    Aug. 20, 2020

Related U.S. Application Data

(60) Provisional application No. 62/806,500, filed on Feb. 15, 2019.

(51) Int. Cl.
| | | |
|---|---|---|
| *H04W 4/00* | (2018.01) | |
| *H04W 52/02* | (2009.01) | |
| *H04W 36/00* | (2009.01) | |
| *H04W 36/06* | (2009.01) | |
| *H04W 36/38* | (2009.01) | |

(52) U.S. Cl.
CPC ... *H04W 52/0216* (2013.01); *H04W 36/0069* (2018.08); *H04W 36/06* (2013.01); *H04W 36/38* (2013.01)

(58) Field of Classification Search
USPC ................................ 370/311, 328, 329, 330
See application file for complete search history.

(56) References Cited

U.S. PATENT DOCUMENTS

| 10,813,137 | B2* | 10/2020 | Shih | ................. H04W 74/0833 |
|---|---|---|---|---|
| 2019/0045491 | A1 | 2/2019 | Zhang et al. | |
| 2019/0132109 | A1* | 5/2019 | Zhou | ....................... H04L 5/001 |
| 2019/0261405 | A1* | 8/2019 | Ang | ................... H04W 72/0446 |
| 2019/0394732 | A1* | 12/2019 | Loehr | ................. H04W 72/042 |
| 2020/0029315 | A1* | 1/2020 | Lin | ........................ H04L 5/0051 |
| 2020/0053613 | A1* | 2/2020 | Cirik | ..................... H04L 27/261 |

(Continued)

FOREIGN PATENT DOCUMENTS

| CN | 108886804 A | 11/2018 |
|---|---|---|
| CN | 1091196937 A | 1/2019 |
| WO | WO 2019029528 A1 | 2/2019 |

OTHER PUBLICATIONS

China National Intellectual Property Administration, International Search Report and Written Opinion tor PCT/CN2020/075269, dated May 8, 2020.

(Continued)

*Primary Examiner* — David Q Nguyen
(74) *Attorney, Agent, or Firm* — Han IP PLLC; Andy M. Han

(57) ABSTRACT

Various solutions for power saving for New Radio (NR) carrier aggregation in mobile communications are described. An apparatus receives, from a wireless network, a trigger signal. The apparatus switches between a first bandwidth part (BWP) and a second BWP of at least two BWPs for a secondary cell (SCell) in response to receiving the trigger signal. No physical downlink control channel (PDCCH) monitoring is configured for the first BWP while PDCCH monitoring is configured for the second BWP.

12 Claims, 4 Drawing Sheets

(56) References Cited

U.S. PATENT DOCUMENTS

| | | | |
|---|---|---|---|
| 2020/0213067 A1* | 7/2020 | Cirik | H04L 1/1819 |
| 2020/0344019 A1* | 10/2020 | Da Silva | H04B 7/0626 |
| 2021/0037505 A1* | 2/2021 | Kim | H04W 72/04 |
| 2021/0045092 A1* | 2/2021 | Gotoh | H04W 52/248 |

OTHER PUBLICATIONS

Catt, Further issues with DL BWP switching for CFRA, 3GPP TSG-RAN WG2 AH-1807, R2-1809515, Montreal, Canada, Jul. 2-6, 2018.

Taiwan Intellectual Property Office, Office Action for Taiwan Patent Application No. 109104752, dated Mar. 10, 2021.

Qualcomm Incorporated, UE Adaptation to the Traffic and UE Power Consumption Characteristics, 3GPP TSG-RAN WG1 Meeting #94bis, R1-1811282, Chengdu, China, Oct. 8-12, 2018.

* cited by examiner

POWER SAVING FOR NEW RADIO CARRIER AGGREGATION

CROSS REFERENCE TO RELATED PATENT APPLICATION(S)

The present disclosure is part of a non-provisional application claiming the priority benefit of U.S. Patent Application No. 62/806,500, filed on 15 Feb. 2019, the contents of which being incorporated by reference in its entirety.

TECHNICAL FIELD

The present disclosure is generally related to mobile communications and, more particularly, to power saving for New Radio (NR) carrier aggregation in mobile communications.

BACKGROUND

Unless otherwise indicated herein, approaches described in this section are not prior art to the claims listed below and are not admitted as prior art by inclusion in this section.

In New Radio (NR), a user equipment (UE) is generally in either a wake-up mode or a power-saving or low-power mode. While in the wake-up mode, the UE typically monitors for control information, receives downlink (DL) data, and transmits uplink (UL) data, for example. It is possible that the UE can consume a significant portion of total power consumption on monitoring the physical downlink control channel (PDCCH). As UEs are typically mobile and hence operate on portable power supplies (e.g., a battery), it is imperative that the UE can minimize power consumption so as to prolong the time during which operation of the UE is sustained by its portable power supply.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to power saving for NR carrier aggregation in mobile communications.

In one aspect, a method may involve an apparatus receiving, from a wireless network, a trigger signal before data scheduling. The method may also involve the apparatus switching between a first bandwidth part (BWP) and a second BWP of at least two BWPs for a secondary cell responsive to receiving the trigger signal. No PDCCH monitoring may be configured for the first BWP while PDCCH monitoring may be configured for the second BWP.

In another aspect, a method may involve an apparatus receiving, from a wireless network, a higher-layer signaling that configures at least two BWPs for a SCell with a first BWP of the at least two BWPs being a particular BWP for which no PDCCH monitoring is configured. The method may also involve the apparatus switching between the first BWP and a second BWP of the at least two BWPs for the SCell.

In yet another aspect, an apparatus may include a transceiver and a processor coupled to the transceiver. The transceiver may be configured to wirelessly communicate with a wireless network. The processor may receive, via the transceiver, from the wireless network a trigger signal before data scheduling. The processor may also switch, via the transceiver, between a first BWP and a second BWP of at least two BWPs for a secondary cell responsive to receiving the trigger signal. No PDCCH monitoring may be configured for the first BWP while PDCCH monitoring may be configured for the second BWP.

It is noteworthy that, although description provided herein may be in the context of certain radio access technologies, networks and network topologies such as 5th Generation (5G) and NR, the proposed concepts, schemes and any variation(s)/derivative(s) thereof may be implemented in, for and by other types of radio access technologies, networks and network topologies such as, for example, Long-Term Evolution (LTE), LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power saving for NR carrier aggregation with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
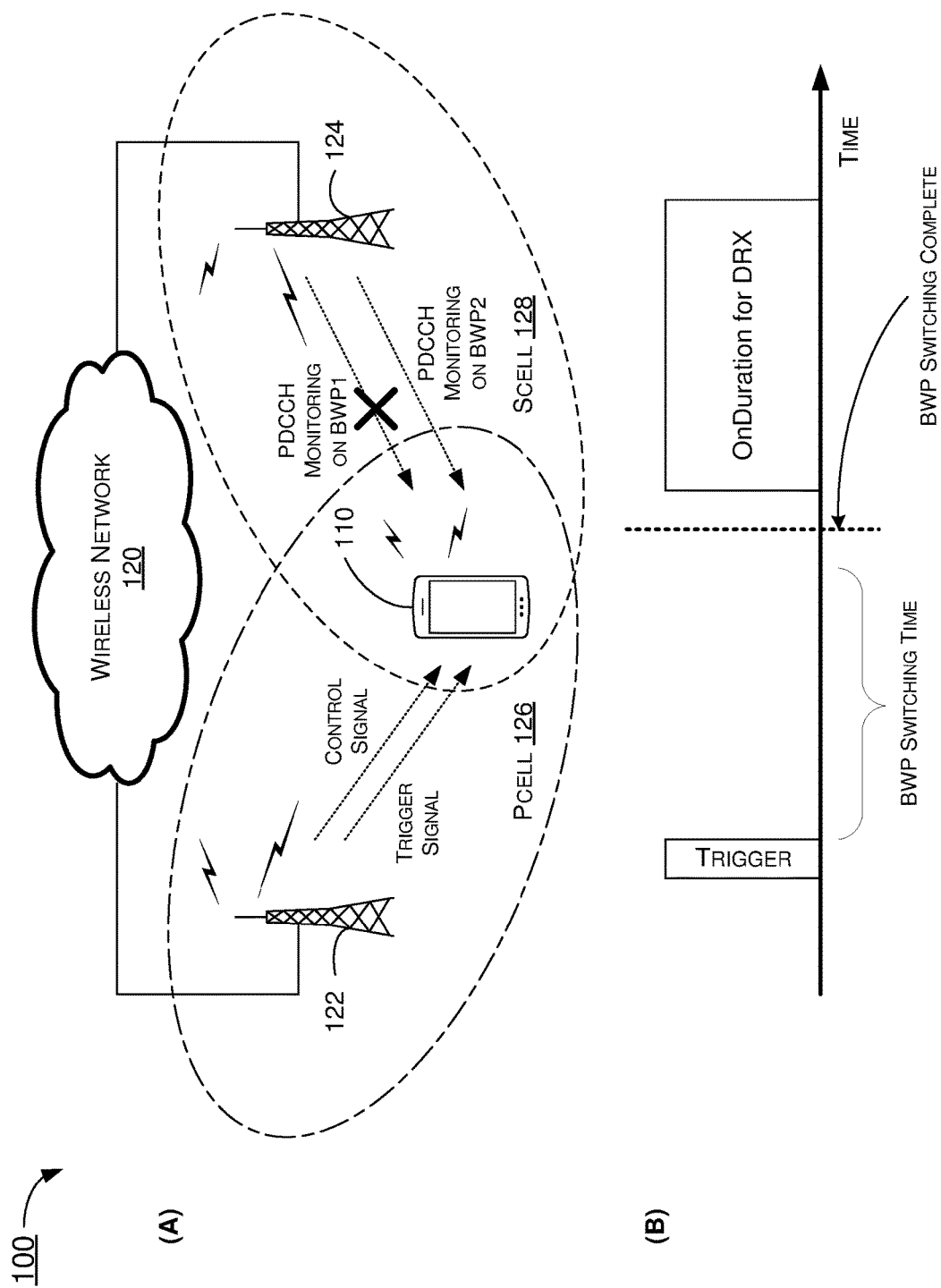
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to part (A) of FIG. 1, network environment 100 may be an NR communication environment involving a UE 110 and a wireless network 120 (e.g., NR mobile network). UE 110 may be implemented in the form of, for example and without limitation, a portable apparatus (e.g., smartphone), a wearable device (e.g., smartwatch), a vehicle or a component thereof, a roadside unit (RSU) (e.g., a traffic signal, a streetlamp, a roadside sensor or a roadside structure) or an Internet of Thing (loT) device (e.g., a sensor). Wireless network 120 may be in wireless communication with UE 110 via a first network node 122 (e.g., an eNB, gNB or transmit/receive point (TRP)) and/or a second network node 124 (e.g., an eNB, gNB or TRP). In the example shown in FIG. 1, first network node 122 may be associated with a primary cell (PCell) 126 and second network node 124 may be associated with a secondary cell (SCell) 128 as part of wireless network 120. For instance, PCell 126 may operate on a primary frequency in which UE 110 may either perform an initial connection establishment procedure or initiate a connection re-establishment procedure. Alternatively, PCell 126 may be indicated as the primary cell in a handover procedure with respect to UE 110. Moreover, SCell 128 may operate on a secondary frequency which may be configured once a radio resource control (RRC) connection is established with UE 110 and which may be used to provide additional radio resources (e.g., one or more BWPs). In network environment 100, UE 110 and wireless network 120 (via first network node 122 and/or second network node 124) may implement various schemes pertaining to power saving for NR carrier aggregation in mobile communications (e.g., NR mobile communications) in accordance with the present disclosure.

Under a proposed scheme in accordance with the present disclosure, UE 110 may be configured with at least two BWPs for SCell 128, with one BWP of the at least two BWPs set up or otherwise configured as a particular BWP with respect to the monitoring of PDCCH on that BWP. That is, the proposed scheme configures a particular BWP to be without PDCCH monitoring for SCell 128 to allow UE 110 dormancy behavior, while the particular BWP is the active BWP of SCell 128 for UE 110, to realize faster SCell access switching than LTE by exploiting a short BWP switching time. As a UE in NR may have one active BWP for downlink (e.g., monitoring control information in a PDCCH and/or receiving data in a physical downlink shared channel (PDSCH)) at any given time, when UE 110 switches its active BWP to the particular BWP UE 110 would stop monitoring the PDCCH to thereby reduce power consumption. That is, in NR, UE 110 is not expected to receive or monitor PDSCH, PDCCH, channel state information reference signal (CSI-RS) or tracking reference signal (TRS) outside an active BWP, and when UE 110 switches to the particular BWP, UE 110 would not monitor the PDCCH as PDCCH monitoring is not configured for the particular BWP. Conversely, when switched to another BWP (which is a regular BWP) as the active BWP, UE 110 would monitor the PDCCH on that BWP.

Under a proposed scheme, a field in downlink control information (DCI) may be utilized to indicate to UE 110 to switch from a regular BWP to the particular BWP or from the particular BWP to the same or another regular BWP among the at least two BWPs of SCell 128. Additionally, under the proposed scheme, BWP switching may be performed and completed before data scheduling so as to avoid data interruption. Moreover, under the proposed scheme, a power saving signal may be utilized as a trigger signal to trigger BWP switching by UE 110 in addition to triggering PDCCH monitoring for an upcoming discontinuous reception (DRX) on-duration. For instance, the trigger occasion may occur earlier than a start of the DRX on-duration by at least a BWP switching delay.

For instance, SCell 128 may be configured to have at least two BWPs for use by UE 110, namely a first BWP and a second BWP. Under the proposed schemes, PCell 126 may transmit, via first network node 122, a high-layer signaling (e.g., RRC signaling) to UE 110 to configure the first BWP as a particular BWP for which no PDCCH monitoring is configured. In other words, with respect to PDCCH monitoring, the first BWP may be a particular BWP for which no PDCCH monitoring is configured and the second BWP may be a regular BWP for which PDCCH monitoring is configured.

Referring to part (B) of FIG. 1, PCell 126 may also transmit, via first network node 122, a trigger signal (e.g., a power saving signal) to UE 110 to trigger BWP switching. In response to receiving the trigger signal, UE 110 may switch between the first BWP and the second BWP of the at least two BWPs for SCell 128. In the example shown in part (B) of FIG. 1, the trigger signal may be transmitted by first network node 122 and received by UE 110 before a start of a DRX on-duration (denoted as "OnDuration" in FIG. 1) during which UE 110 is in an active mode (e.g., a wake-up mode). In some cases, the trigger signal may be received by UE 110 sufficiently earlier before the start of the DRX on-duration by at least a BWP switching delay to allow sufficient time for UE 110 to perform the BWP switching to switch its active BWP from the first BWP to the second BWP or from the second BWP to the first BWP. Moreover, the trigger signal may be received by UE 110 sufficiently early in order for UE 110 to perform BWP switching before data scheduling to avoid data interruption (e.g., interruption of data reception and/or data transmission by UE 110).

Illustrative Implementations

Figure 2:
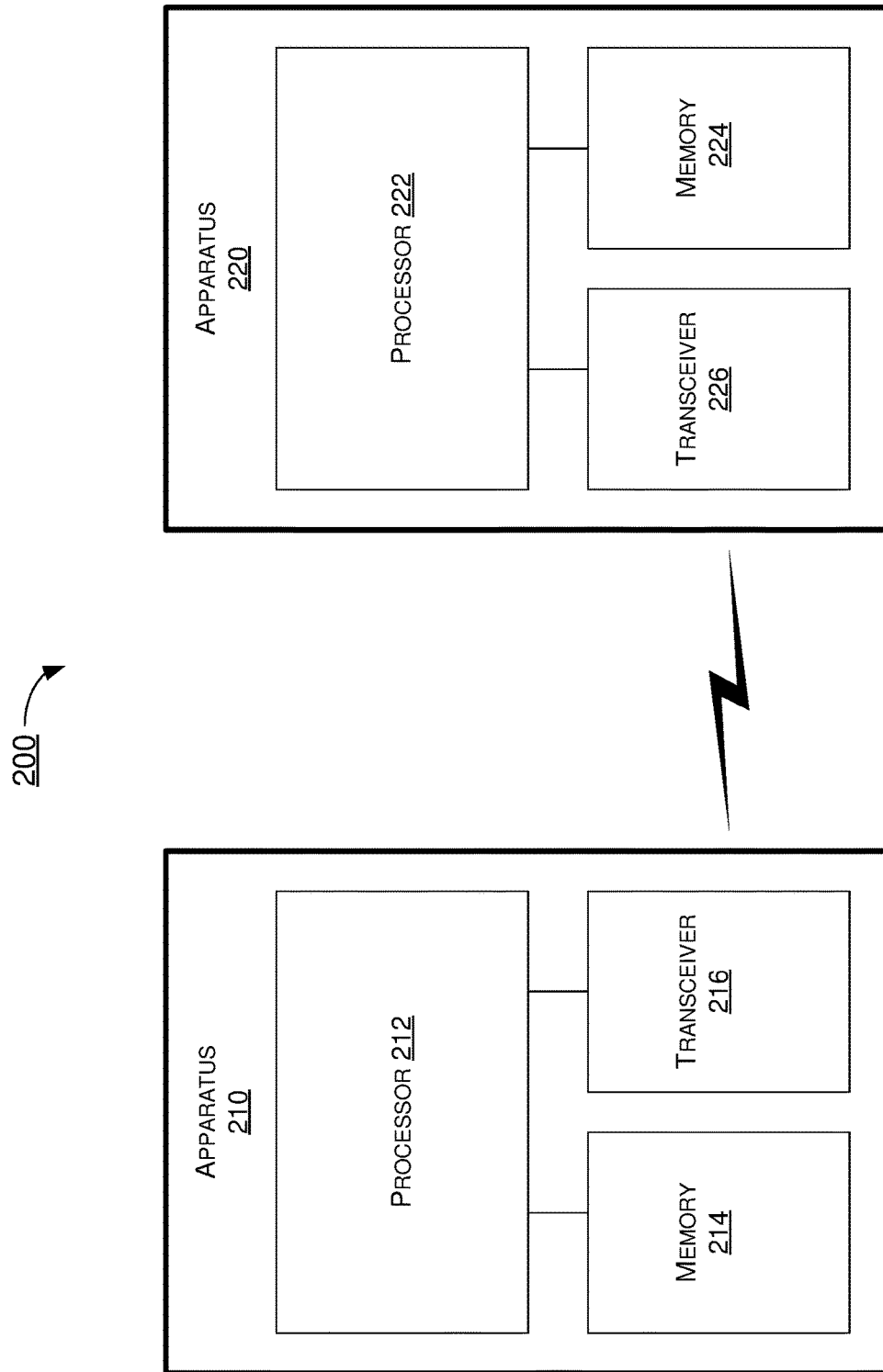
FIG. 2 is a block diagram of an example communication system in accordance with an implementation of the present disclosure.

FIG. 2 illustrates an example communication system 200 involving an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to power saving for NR carrier aggregation in mobile communications in accordance with the present disclosure, including scenarios/schemes described above as well as processes described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT or NB-IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT or NB-IoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively.

To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE (e.g., UE 110) and network apparatus 220 is implemented in or as a network node (e.g., first network node 122 or PCell 126) of a communication network (e.g., wireless network 120).

Under a proposed scheme in accordance with the present disclosure, processor 212 of apparatus 210 may receive, via transceiver 216, from a wireless network (e.g., wireless network 120) via apparatus 220 (e.g., PCell 126) a higher-layer signaling (e.g., RRC signaling) that configures at least two BWPs for a SCell (e.g., SCell 128). Processor 212 may also receive, via transceiver 216, from the wireless network a trigger signal. In response to receiving the trigger signal, processor 212 may switch, via transceiver 216, between a first BWP and a second BWP of at least two BWPs for SCell 128. In such cases, no PDCCH monitoring may be configured for the first BWP while PDCCH monitoring may be configured for the second BWP.

In some implementations, in switching, processor 212 may switch before data scheduling.

In some implementations, in receiving the trigger signal, processor 212 may receive the trigger signal before a start of a DRX on-duration during which apparatus 210 is in an active mode. In some implementations, the trigger signal may be received before the start of the DRX on-duration by at least a BWP switching delay of apparatus 210.

In some implementations, in receiving the trigger signal, processor 212 may receive a power saving signal that triggers the switching. For instance, processor 212 may receive a PDCCH control signal or DCI serving as the power saving signal.

In some implementations, processor 212 may also receive, via transceiver 216, from the wireless network (e.g., wireless network 120) via apparatus 220 (e.g., PCell 126) a higher-layer signaling (e.g., RRC signaling) that configures the at least two BWPs for the SCell.

Under another proposed scheme in accordance with the present disclosure, processor 212 of apparatus 210 may receive, via transceiver 216, from a wireless network (e.g., wireless network 120) via apparatus 220 (e.g., PCell 126) a trigger signal. In some implementations, in switching, processor 212 may switch before data scheduling. Moreover, processor 212 may switch, via transceiver 216, between a first BWP and a second BWP of at least two BWPs for a SCell (e.g., SCell 128) responsive to receiving the trigger signal. In such cases, no PDCCH monitoring may be configured for the first BWP while PDCCH monitoring may be configured for the second BWP.

In some implementations, in receiving the trigger signal, processor 212 may receive the trigger signal before a start of a DRX on-duration during which apparatus 210 is in an active mode. In some implementations, the trigger signal may be received before the start of the DRX on-duration by at least a BWP switching delay of apparatus 210.

In some implementations, in receiving the trigger signal, processor 212 may receive a power saving signal that triggers the switching. For instance, processor 212 may receive a PDCCH control signal or DCI serving as the power saving signal.

In some implementations, in switching between the first BWP and the second BWP, processor 212 may perform certain operations. For instance, processor 212 may switch from the second BWP to the first BWP. Additionally, processor 212 may enter a power-saving mode. Alternatively, processor 212 may switch from the first BWP to the second BWP and enter an active mode to monitor a PDCCH on the second BWP.

In some implementations, processor 212 may perform additional operations. For instance, processor 212 may receive, via transceiver 216, from the wireless network a higher-layer signaling (e.g., RRC signaling) that configures the at least two BWPs for the SCell.

Illustrative Processes

Figure 3:
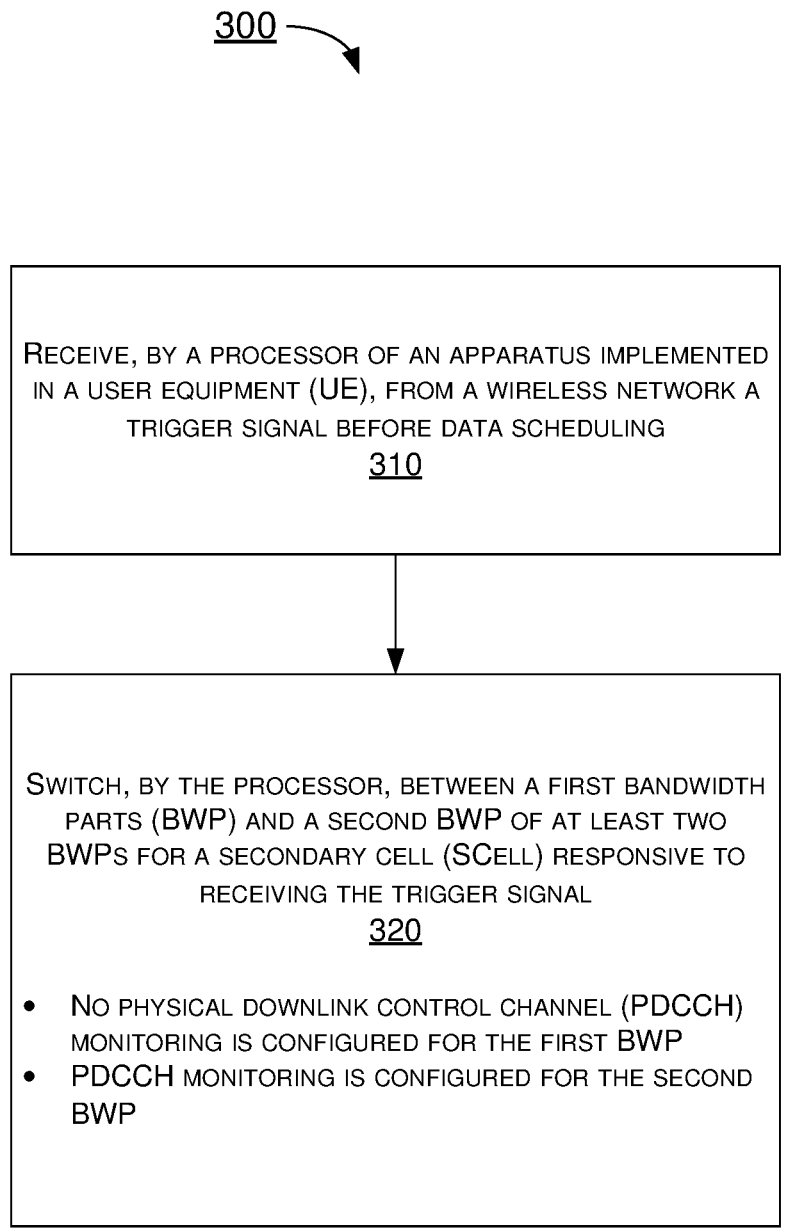
FIG. 3 is a flowchart of an example process in accordance with an implementation of the present disclosure.

FIG. 3 illustrates an example process 300 in accordance with an implementation of the present disclosure. Process 300 may be an example implementation of above scenarios/schemes, whether partially or completely, with respect to power saving for NR carrier aggregation in mobile communications in accordance with the present disclosure. Process 300 may represent an aspect of implementation of features of communication apparatus 210. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 receiving, via transceiver 216, from a wireless network (e.g., wireless network 120) via a network node (e.g., first network node 122 or second network node 124) a trigger signal. Process 300 may proceed from 310 to 320.

At 320, process 300 may involve processor 212 switching, via transceiver 216, between a first BWP and a second BWP of at least two BWPs for a SCell (e.g., SCell 128) responsive to receiving the trigger signal. In such cases, no PDCCH monitoring may be configured for the first BWP while PDCCH monitoring may be configured for the second BWP.

In some implementations, in switching, process 300 may involve processor 212 switching before data scheduling.

In some implementations, in receiving the trigger signal, process 300 may involve processor 212 receiving the trigger signal before a start of a DRX on-duration during which apparatus 210 is in an active mode. In some implementations, the trigger signal may be received before the start of the DRX on-duration by at least a BWP switching delay of apparatus 210.

In some implementations, in receiving the trigger signal, process 300 may involve processor 212 receiving a power saving signal that triggers the switching. For instance, process 300 may involve processor 212 receiving a PDCCH control signal or DCI serving as the power saving signal.

In some implementations, in switching between the first BWP and the second BWP, process 300 may involve processor 212 performing certain operations. For instance, process 300 may involve processor 212 switching from the second BWP to the first BWP. Additionally, process 300 may involve processor 212 entering a power-saving mode. Alternatively, process 300 may involve processor 212 switching from the first BWP to the second BWP and enter an active mode to monitor a PDCCH on the second BWP.

In some implementations, process 300 may involve processor 212 performing additional operations. For instance, process 300 may involve processor 212 receiving, via transceiver 216, from the wireless network a higher-layer signaling (e.g., RRC signaling) that configures the at least two BWPs for the SCell.

Figure 4:
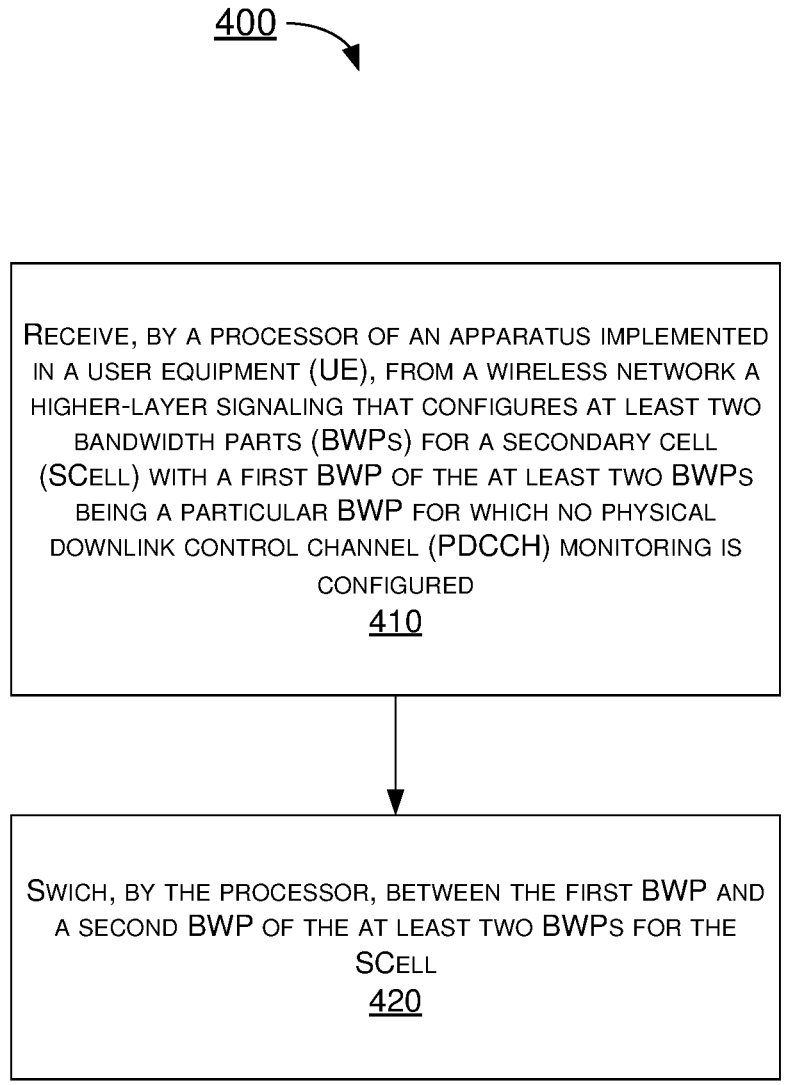
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to power saving for NR carrier aggregation in mobile communications in accordance with the present disclosure. Process 400 may represent an aspect of implementation of features of communication apparatus 210. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210. Process 400 may begin at block 410.

At 410, process 400 may involve processor 212 of apparatus 210 receiving, via transceiver 216, from a wireless network (e.g., wireless network 120) via a network node (e.g., first network node 122 or second network node 124) a higher-layer signaling (e.g., RRC signaling) that configures at least two BWPs for a SCell with a first BWP of the at least two BWPs being a particular BWP for which no PDCCH monitoring is configured. Process 400 may proceed from 410 to 420.

At 420, process 400 may involve processor 212 switching, via transceiver 216, between the first BWP and a second BWP of the at least two BWPs for the SCell.

In some implementations, in switching, process 400 may involve processor 212 switching before data scheduling.

In some implementations, in switching between the first BWP and the second BWP, process 400 may involve processor 212 performing certain operations. For instance, process 400 may involve processor 212 switching from the second BWP to the first BWP. Moreover, process 400 may involve processor 212 entering a power-saving mode. Alternatively, process 400 may involve processor 212 switching from the first BWP to the second BWP and enter an active mode to monitor a PDCCH on the second BWP.

In some implementations, in switching between the first BWP and the second BWP, process 400 may involve processor 212 performing certain operations. For instance, process 400 may involve processor 212 receiving from the wireless network a trigger signal. Additionally, process 400 may involve processor 212 switching between the first BWP and the second BWP for the SCell responsive to receiving the trigger signal. In some implementations, in receiving the trigger signal, process 400 may involve processor 212 receiving a power saving signal that triggers the switching. For instance, process 400 may involve processor 212 receiving a PDCCH control signal or DCI serving as the power saving signal. Alternatively, or additionally, in receiving the trigger signal, process 400 may involve processor 212 receiving the trigger signal before a start of a DRX on-duration during which the apparatus is in an active mode. In some implementations, the trigger signal may be received before the start of the DRX on-duration by at least a BWP switching delay of apparatus 210.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus implemented in a user equipment (UE), from a wireless network a trigger signal; and
   switching, by the processor, between a first bandwidth part (BWP) and a second BWP of at least two BWPs for a secondary cell (SCell) responsive to receiving the trigger signal,
   wherein physical downlink control channel (PDCCH) monitoring is not configured for the first BWP such that no PDCCH is monitored and no downlink control information (DCI) is received in an entirety of the first BWP by the UE, and
   wherein PDCCH monitoring is configured for the second BWP.

2. The method of claim 1, wherein the switching comprises switching before data scheduling.

3. The method of claim 2, wherein the receiving of the trigger signal comprises receiving the trigger signal before a start of a discontinuous reception (DRX) on-duration during which the apparatus is in an active mode.

4. The method of claim 3, wherein the trigger signal is received before the start of the DRX on-duration by at least a BWP switching delay of the UE.

5. The method of claim 1, wherein the receiving of the trigger signal comprises receiving a power saving signal that triggers the switching, and wherein the receiving of the power saving signal comprises receiving a PDCCH control signal or DCI.

6. The method of claim 1, further comprising:
receiving, by the processor, from the wireless network a higher-layer signaling that configures the at least two BWPs for the SCell.

7. An apparatus implementable in a user equipment (UE), comprising:
a transceiver configured to wirelessly communicate with a wireless network; and
a processor coupled to the transceiver and configured to perform operations comprising:
receiving, via the transceiver, from a wireless network a trigger signal; and
switching, via the transceiver, between a first bandwidth part (BWP) and a second BWP of at least two BWPs for a secondary cell (SCell) responsive to receiving the trigger signal,
wherein physical downlink control channel (PDCCH) monitoring is not configured for the first BWP such that no PDCCH is monitored and no downlink control information (DCI) is received in an entirety of the first BWP by the UE, and
wherein PDCCH monitoring is configured for the second BWP.

8. The apparatus of claim 7, wherein, in switching, the processor switches before data scheduling.

9. The apparatus of claim 8, wherein, in receiving the trigger signal, the processor receives the trigger signal before a start of a discontinuous reception (DRX) on-duration during which the apparatus is in an active mode.

10. The apparatus of claim 9, wherein the trigger signal is received before the start of the DRX on-duration by at least a BWP switching delay of the apparatus.

11. The apparatus of claim 7, wherein, in receiving the trigger signal, the processor receives a power saving signal that triggers the switching, and wherein the power saving signal comprises a PDCCH control signal or DCI.

12. The apparatus of claim 7, wherein the processor is further configured to perform operations comprising:
receiving, via the transceiver, from the wireless network a higher-layer signaling that configures the at least two BWPs for the SCell.

* * * * *